United States Patent
Stimpfle-Ziegler

(10) Patent No.: US 9,127,506 B2
(45) Date of Patent: Sep. 8, 2015

(54) AUGER

(75) Inventor: Andreas Stimpfle-Ziegler, Aichach (DE)

(73) Assignee: Bauer Maschinen GmbH, Schrobenhausen (DE)

(*) Notice: Subject to any disclaimer, the term of this patent is extended or adjusted under 35 U.S.C. 154(b) by 236 days.

(21) Appl. No.: 13/349,050

(22) Filed: Jan. 12, 2012

(65) Prior Publication Data

US 2012/0205161 A1 Aug. 16, 2012

(30) Foreign Application Priority Data

Feb. 11, 2011 (EP) .................................. 11001142

(51) Int. Cl.
*E21B 10/44* (2006.01)
*E21B 17/22* (2006.01)
*E21B 7/00* (2006.01)
*E02D 5/36* (2006.01)
*B65G 33/00* (2006.01)
*B65G 33/26* (2006.01)

(52) U.S. Cl.
CPC . *E21B 7/005* (2013.01); *E02D 5/36* (2013.01); *E21B 10/44* (2013.01); *E21B 17/22* (2013.01); *B65G 33/00* (2013.01); *B65G 33/265* (2013.01)

(58) Field of Classification Search
CPC ...... B65G 33/265; B65G 33/00; E21B 7/005; E21B 17/22; E21B 10/44
USPC ............ 175/57, 310, 323, 394; 198/647, 657, 198/666, 671, 662, 664; 405/252.1, 253, 405/254, 241; 403/1, 182, 335, 408.1
See application file for complete search history.

(56) References Cited

U.S. PATENT DOCUMENTS

| | | | |
|---|---|---|---|
| 137,744 A | 4/1873 | West | |
| 843,676 A * | 2/1907 | Gustavsen | 198/661 |
| 991,499 A * | 5/1911 | Glover et al. | 198/664 |
| 2,320,612 A | 6/1943 | Kandle | |
| 2,981,403 A * | 4/1961 | Goodrich | 198/676 |
| 3,175,630 A | 3/1965 | Etal | |
| 4,976,341 A * | 12/1990 | Lundell | 198/666 |
| 5,639,202 A * | 6/1997 | Roycraft | 414/412 |
| 6,390,283 B1 * | 5/2002 | Goodwin | 198/664 |
| 7,946,355 B1 | 5/2011 | Kluge | |
| 2009/0294181 A1 | 12/2009 | Barbera | |

FOREIGN PATENT DOCUMENTS

| | | |
|---|---|---|
| CN | 201178567 Y | 1/2009 |
| JP | H11-5077 A | 1/1999 |
| JP | 2002-30686 A | 1/2002 |

* cited by examiner

*Primary Examiner* — Jennifer H Gay
*Assistant Examiner* — George Gray
(74) *Attorney, Agent, or Firm* — Studebaker & Brackett PC

(57) ABSTRACT

An auger having a cutting unit for removing ground material and a conveyor flight for conveying the ground material removed by the cutting unit, whereby the conveyor flight has several conveyor flight pieces which are arranged along an axial direction of the auger and connected to each other in a detachable manner. A central receiving shaft is provided, on which the cutting member is arranged in a rotationally fixed manner. Furthermore, each of the conveyor flight pieces of the conveyor flight has a mounting pipe which is mounted onto the central receiving shaft, whereby the central receiving shaft projects through the mounting pipe such that the conveyor flight pieces are to be connected in a rotationally fixed manner to the central receiving shaft.

11 Claims, 8 Drawing Sheets

AUGER

Figure 1:
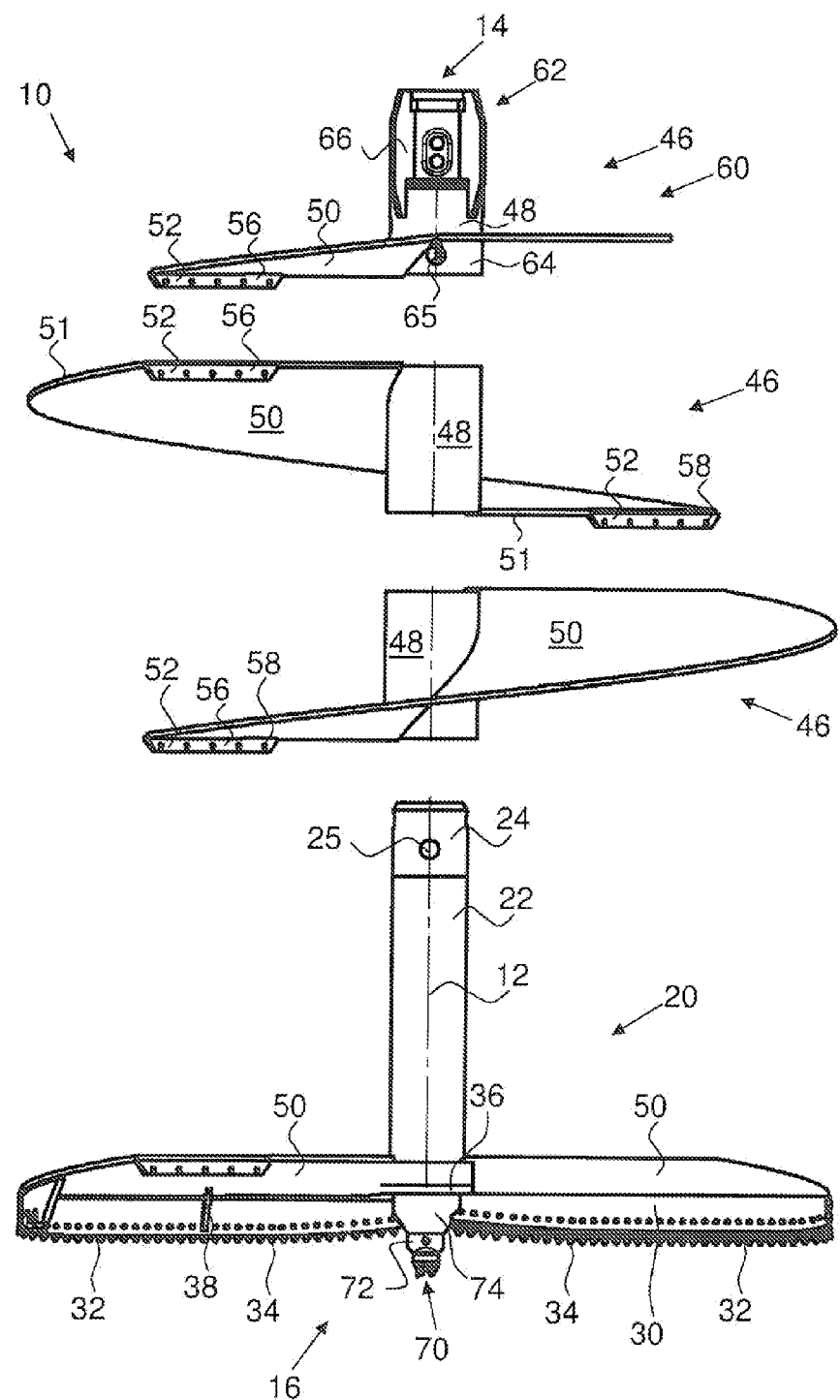

The invention relates to an auger according to the preamble of claim 1.

The auger has a cutting means for removing ground material and a conveyor flight for conveying the ground material removed by the cutting means. The conveyor flight comprises several conveyor flight pieces which are arranged along an axial direction of the auger and connected to each other in a detachable manner.

An auger of such type which is constructed of segments consisting in several flight pieces is known from DE 295 06 880 U1 for example.

Another auger composed of several segments is described in DE 10 2006 022 613 A1.

The known augers composed of segments are so-called continuous flight augers. In these augers a continuous conveyor flight substantially runs along the entire length of the drill rod from the drill drive up to the drill bit. For the production of a borehole the auger is drilled into the ground up to the desired depth, while ground material is conveyed in the upward direction. During retraction of the auger concrete can be pumped into the hollow space thus developed in order to produce a bored pile.

The continuous flight augers composed of segments enable the production of boreholes having drilling depths that are greater than the length of a mast, along which the continuous flight auger is moved. For this purpose the individual conveyor flight pieces of the continuous flight auger can be coupled to each other successively during the production of a borehole in order to thereby obtain a continuous flight auger composed of several individual flight augers, the length of which corresponds to the depth of the desired borehole.

Moreover, the segmental continuous flight augers allow for an improved transportability, since the length of the individual conveyor flight pieces is smaller than the total length of the assembled auger.

The invention is based on the object to provide an auger which is easy to transport even in the case of large diameters.

The object is solved in accordance with the invention by an auger having the features of claim 1. Preferred embodiments are stated in the dependent claims as well as in the subsequent description and Figures.

According to the invention the auger is characterized in that a central receiving shaft is provided, on which cutting means being arranged in a rotationally fixed manner, the conveyor flight pieces of the conveyor flight have a mounting pipe each, which is mounted onto the central receiving shaft, whereby the receiving shaft projects through the mounting pipe, and the conveyor flight pieces are connected in a rotationally fixed manner to the central receiving shaft.

Basically, the auger according to the invention can be a so-called continuous flight auger, as described above. However, in a preferred embodiment of the invention the auger concerned is employed for an intermittent drilling operation. For the production of a borehole such an auger, which can also be referred to as a short-length auger, is connected to a rod element, in particular a Kelly bar, and thereby forms a drilling element. The auger is drilled into the ground using feed force and on having reached a certain drilling progress it is retracted from the borehole together with the filling of the conveyor flight and emptied next to the borehole. This process is repeated several times until the final depth of the borehole is reached. The rod element without conveyor flight usually has a length corresponding to a multiple of the length of the auger.

A fundamental idea of the invention resides in the fact that an auger is provided which can be transported easily on the road even in the case of a large diameter amounting, for example, to more than 2.50 m. For this purpose the auger, more particularly the conveyor flight, can be dismantled in accordance with the invention.

The invention is based on the finding that in the case of drilling diameters amounting to more than 2.50 m for example it is not the length of the auger but its diameter that is the limiting factor for transport. In order to transport the auger provision is therefore made for the conveyor flight to be dismantled into comparatively short conveyor flight pieces. During transport the conveyor flight pieces can thus be arranged in a transverse manner on the transport vehicle.

As a result of the central receiving shaft, which projects at least partly through the conveyor flight pieces, by preference through all conveyor flight pieces, a high stability of the auger is achieved despite the fact that it can be dismantled. The receiving shaft is preferably designed for retaining and supporting the conveyor flight pieces.

In accordance with the invention the conveyor flight pieces are connected to each other in a detachable manner, enabling them to be transported individually. Furthermore, the conveyor flight pieces are also connected in a detachable manner to the receiving shaft so that they can be transported separately from the receiving shaft. In a preferred embodiment the conveyor flight pieces and the central receiving shaft are designed such that the conveyor flight pieces can be slid or placed onto the receiving shaft.

A detachable connection is understood, in particular, as such a connection that can be detached with tools or manually and that can be restored, in particular through reversal of the detachment process. A detachable connection can be a screw connection for example.

According to the invention the cutting means is connected in a rotationally fixed manner to the receiving shaft. Moreover, the conveyor flight pieces are equally arranged such that they rotate jointly with the receiving shaft. Within the framework of the present application a rotationally fixed connection is understood, in particular, as a connection, in which the connected elements are not rotatable in relation to each other. A rotationally fixed connection permits transmission of a rotational movement or a torque from one element to the other.

Hence, according to the invention receiving shaft, cutting means and conveyor flight pieces are not rotatable relative to each other but rather all these elements rotate jointly. However, it is not absolutely necessary for each individual conveyor flight piece to be fastened in a rotationally fixed manner directly on the receiving shaft. In fact, a conveyor flight piece can also be coupled in a rotationally fixed manner indirectly to the receiving shaft, for example via an adjacent conveyor flight piece or the cutting means. Therefore, within the meaning of a simple construction provision can be made for the central receiving shaft and at least one of the mounting pipes of the conveyor flight pieces to have a cylindrical shape.

To drive the auger provision is made in a preferred embodiment of the invention such that at an axial end lying opposite the cutting means the receiving shaft has a junction area, via which the receiving shaft can be driven in a rotating manner.

Consequently, the auger comprises a first axial end, on which a drive element, as for example a Kelly bar or even a drill drive can be fastened directly, and a second axial end lying opposite the first axial end, in the area of which the cutting means is arranged. Against the background of the drilling progress that is usually directed downwards the first axial end can also be referred to as the upper end and the second axial end can be referred to as the lower end of the auger.

In addition to the rotational movement an axial force can also be transmitted via the junction area to the central receiving shaft. For force transmission the junction area can have form-locking elements, as for example engaging elements, recesses for a bolt connection or other means for a form-locking and/or force-locking connection with the drive element.

To provide a high stability of the auger, in particular also in the case of a greater number of conveyor flight pieces, the length of the central receiving shaft preferably corresponds substantially to the length of the entire auger. Thus, the receiving shaft preferably extends at least approximately along the total length of the auger or the segmental conveyor flight and projects at least partly into or through each conveyor flight piece.

In addition to providing the required stability the receiving shaft preferably also serves for the transmission of forces and moments from a drive element to the cutting means. In particular, it is preferred that the torque required for loosening the ground and the necessary axial force can be transmitted at least to a substantial degree via the central receiving shaft to the cutting means. Basically, the auger can be designed such that the torque can be transmitted exclusively via the central receiving shaft, i.e. not via the individual conveyor flight pieces, from the upper end of the auger to the cutting means. By preference, however, a part of the torque can also be introduced via the individual conveyor flight pieces into the cutting means.

Basically, provision is made for the central receiving shaft to be designed in one piece so as to ensure maximum stability of the auger. However, especially if a certain length of the auger is exceeded, it may also be advantageous for the central receiving shaft to be constructed of segments, with the number of segments of the receiving shaft being preferably smaller than the number of conveyor flight pieces. Hence, the length of the individual shaft segments is preferably greater than the axial length of the individual conveyor flight pieces.

Furthermore, according to the invention it is preferred that the conveyor flight pieces of the conveyor flight have flight plates, which are arranged at an outer circumference of the mounting pipes. The flight plates each constitute a segment of a conveyor helix or conveyor spiral that extends in a continuous fashion along the auger. When the auger is assembled the individual flight plates jointly form a conveyor helix or conveyor spiral. By preference, the flight plates are welded to the mounting pipes or are connected thereto otherwise in a firm and non-detachable manner.

For especially good transportability of the conveyor flight pieces it is preferred that the flight plates of the conveyor flight pieces only have a small number of turns each, in which case a turn can be understood as a flight section of 360°. According to a preferred embodiment the flight plates have a maximum of two turns. It is especially preferred that the flight plates have less than one turn, in particular precisely half a turn.

An advantageous connection of the individual conveyor flight pieces between each other can be attained in that on the flight plates connecting means for detachably connecting the conveyor flight pieces to adjacent conveyor flight pieces are arranged. Each conveyor flight piece therefore comprises at least one connecting means, with which the conveyor flight piece can be connected in a firm but detachable manner to an adjacent conveyor flight piece lying above or below. By way of the connecting means the conveyor flight pieces can be connected to each other in particular in a rotationally fixed manner. Consequently, the connecting means are preferably designed such that a rotational movement can be transmitted from one conveyor flight piece to an adjacent conveyor flight piece.

It is preferred that the connecting means extend along radial edges of the flight plates. The arrangement of the connecting means on the radial edges of the flight plates can be easier and more favorable in terms of construction as compared to connecting means located on the mounting pipes of the conveyor flight pieces.

A particularly simple and yet effective connecting means from a constructional viewpoint is provided in that on the radial edges of the flight plates stops are arranged in each case, which can be connected to a corresponding stop of an adjacent flight plate. The stops can be formed by stop plates for example. In addition, it is preferred that the flight plates are connected to each other in a firm but detachable manner. Here, a firm connection is understood, in particular, as such a connection that does not permit any or at least no relevant relative movement of the connected elements.

In accordance with the invention it is preferred that the cutting means has at least one cutting edge in the area of the conveyor flight run-in. Starting from the central receiving shaft, the said cutting edge preferably extends substantially across the entire radius of the conveyor flight. By way of the cutting means or cutting edge ground material can be loosened substantially across the entire cross-section of the auger. Therefore, the conveyor flight has to take over little or no cutting tasks, serving mainly or exclusively for conveyance of the ground material loosened by the cutting means, more particularly the cutting edge. Hence, the forces acting upon the conveyor flight are small, especially in comparison to a ground-displacing flight. On the cutting edge drilling and/or cutting tools, such as teeth, can be arranged.

By preference, the conveyor flight is designed such that conveyance of the ground material along an axial direction of the auger is rendered possible. For good conveyance of ground material as compared to a more radial ground displacement it is preferred that the diameter of the receiving shaft and/or the mounting pipes is small in comparison to the external diameter of the conveyor flight or the diameter of the borehole to be produced. By preference, the diameter of the conveyor flight or the conveyor flight pieces is a multiple of the diameter of the central receiving shaft and/or the mounting pipes. In this way, an area as large as possible of the auger cross-section is made available for ground conveyance.

For the sake of good transportability the individual conveyor flight pieces can be relatively short and, in particular, have an axial length which is smaller than an admissible width of a transport vehicle employed for transporting the conveyor flight pieces on the road. Especially in the case of conveyor flight pieces with a large diameter it is preferred that the conveyor flight pieces each have axial lengths which are smaller than their diameters.

In another preferred embodiment of the invention provision is made for at least one of the conveyor flight pieces to have a connecting area, which is connected in a rotationally fixed manner to the receiving shaft, in particular the junction area of the receiving shaft. Thus, a rotational movement can be transmitted in particular in a direct way from an uppermost conveyor flight piece to the central receiving shaft. The rotationally fixed connection therefore has the effect that the conveyor flight piece and the receiving shaft always rotate jointly and at the same speed.

A further preferred embodiment is provided in that at an end of the auger lying opposite the cutting means a coupling area is provided, which can be coupled to a drive element for driving the auger in a rotating manner. The coupling area can preferably be arranged on the central receiving shaft and/or on one of the conveyor flight pieces. Accordingly, the drive element can drive the central receiving shaft and/or the conveyor flight piece in a rotating manner. The drive element concerned can be a Kelly bar driven by a rotary motor of a drilling apparatus.

If the coupling area is provided on a conveyor flight piece, especially on an uppermost one, this conveyor flight piece is preferably connected in a rotationally and axially fixed manner to the central receiving shaft so that the forces of the drive element can be introduced via the conveyor flight piece into the central receiving shaft.

Another preferred embodiment of the auger according to the invention resides in the fact that the receiving shaft is designed as a hollow shaft. This offers on the one hand advantages in terms of weight and on the other hand the possibility to introduce a fluid, in particular a hardening mass such as concrete, via the central receiving shaft into the borehole in order to produce a foundation element in the ground for example.

For an axially precise drilling of the auger into the ground it is preferred that at a lower end of the receiving shaft a drill bit is arranged, which precedes the cutting means during drilling operation and is connected in a rotationally fixed manner to the receiving shaft and the cutting means.

The central drill bit can also be referred to as centering bit or pilot bit. The drill bit is preferably attached in a fixed manner, especially in a rotationally fixed yet detachable manner, to the central receiving shaft. To receive the drill bit a receiving means can be provided at a lower end of the central receiving shaft.

In a further aspect the invention relates to a method for producing a borehole in the ground by means of an auger, as described above. In the method ground material is removed by means of the cutting means and conveyed by means of the conveyor flight.

Figure 2:
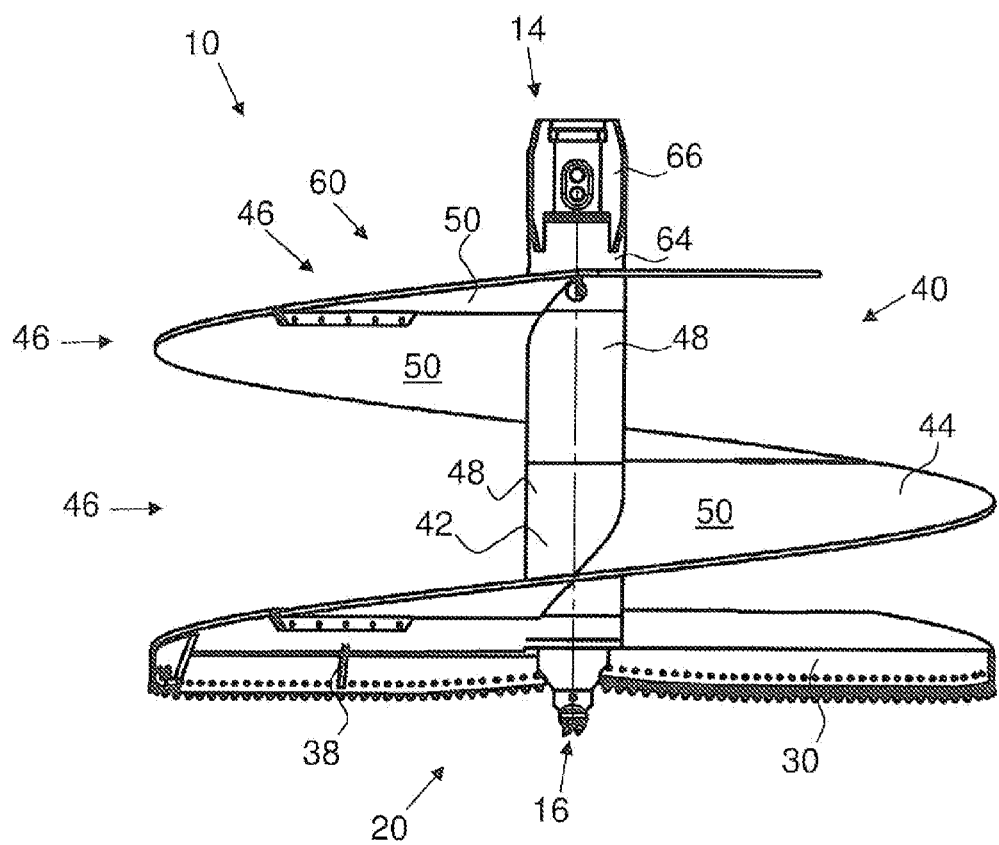
Figure 3:
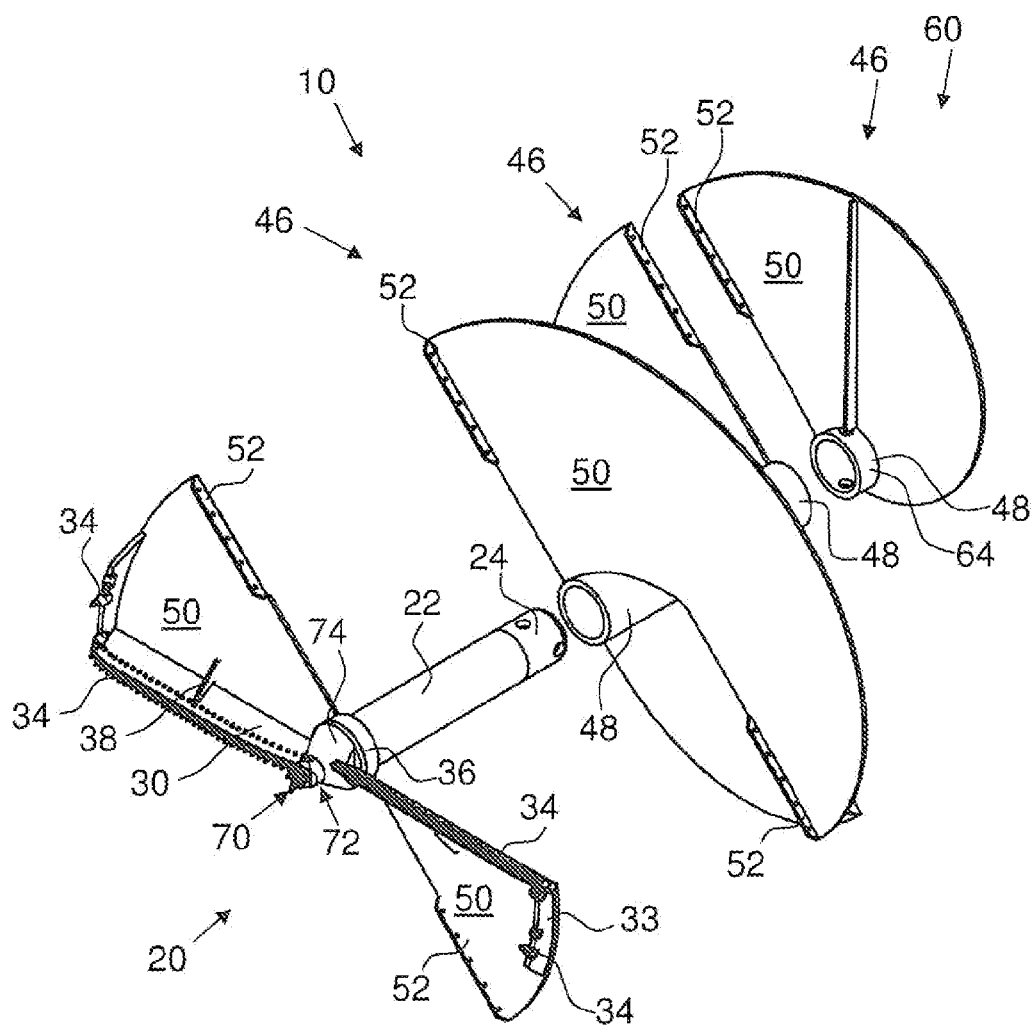
Figure 4:
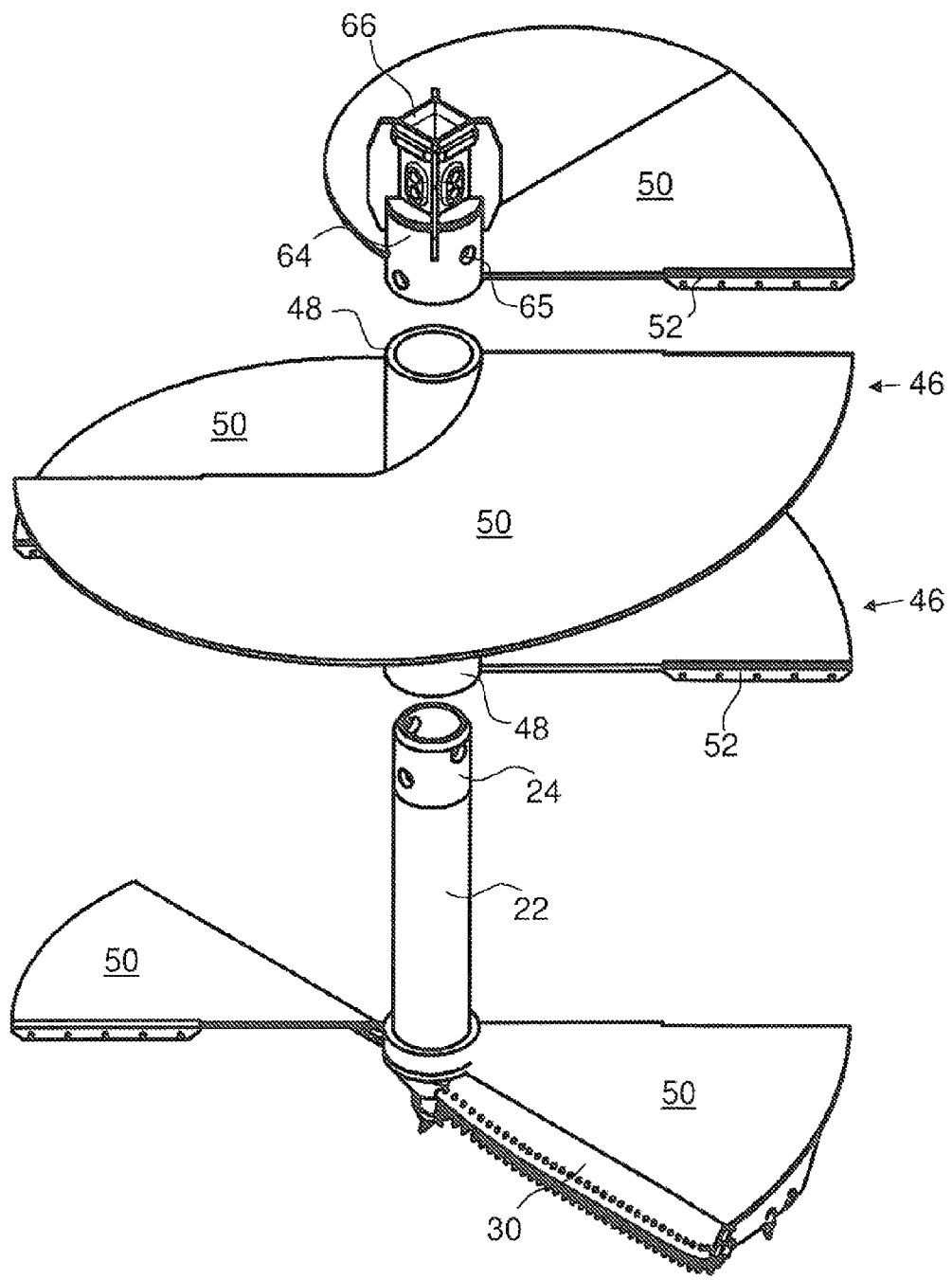
Figure 5:
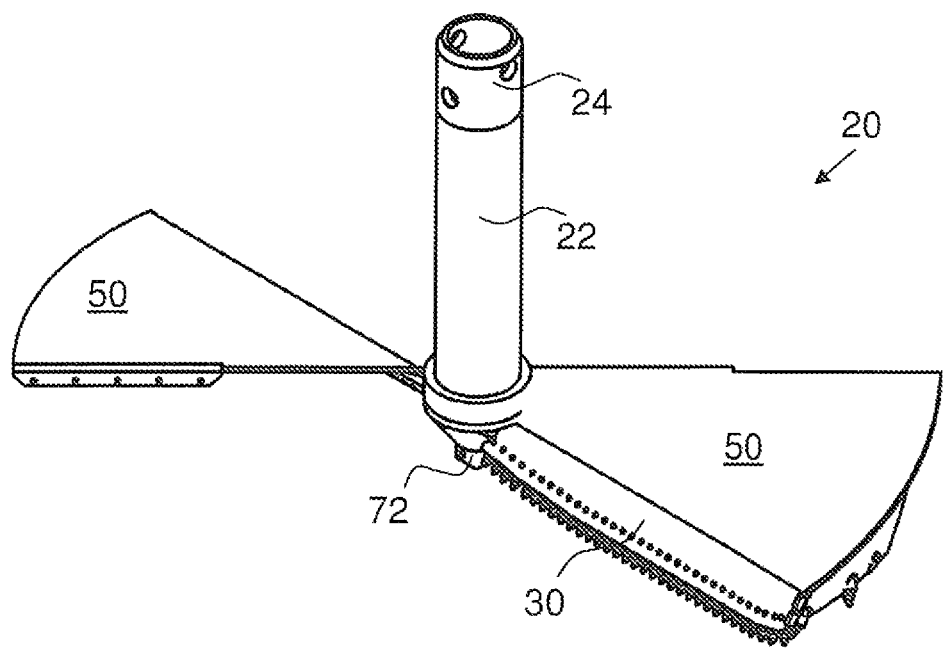
Figure 6:
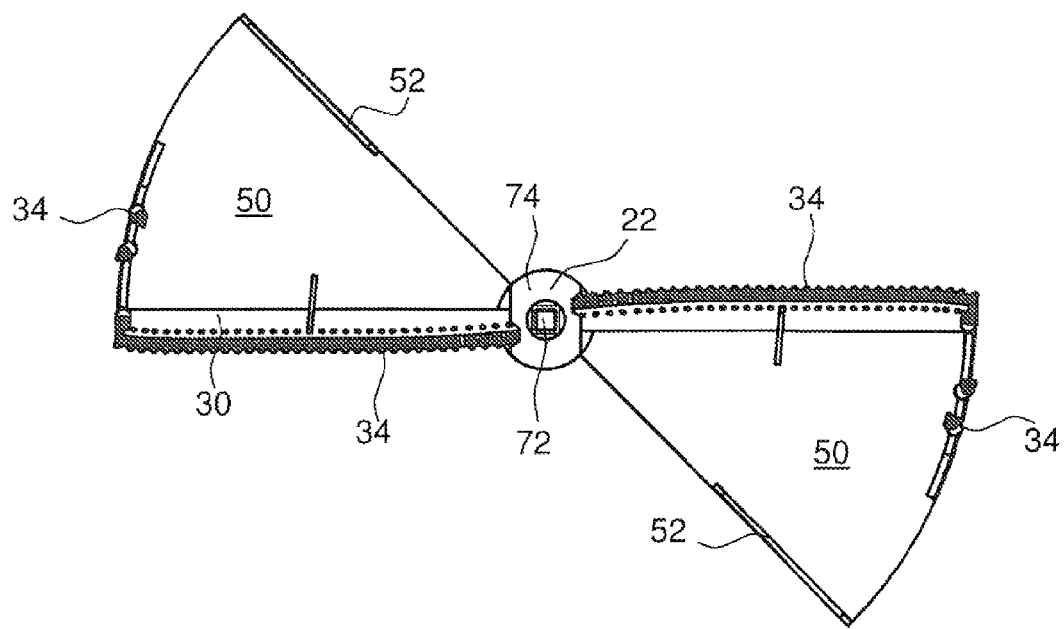
Figure 7:
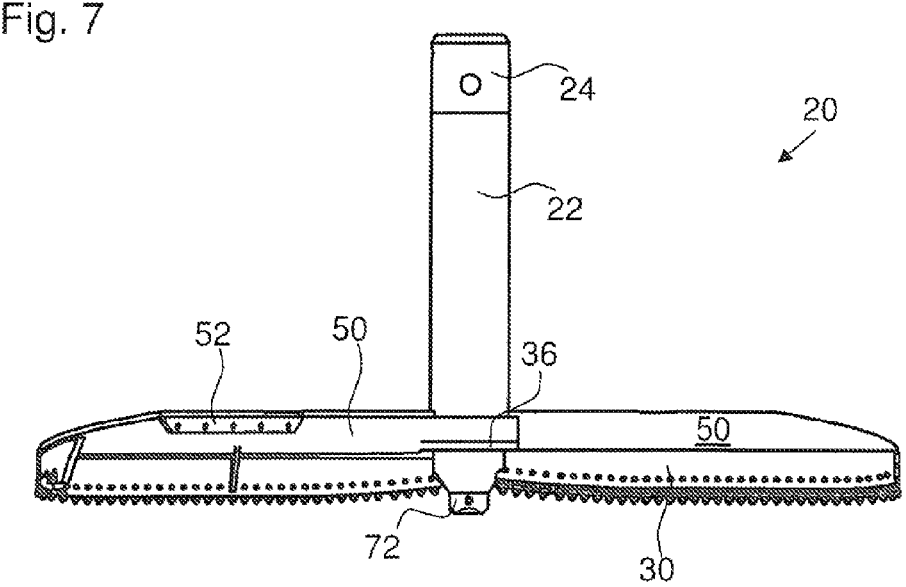
Figure 8:
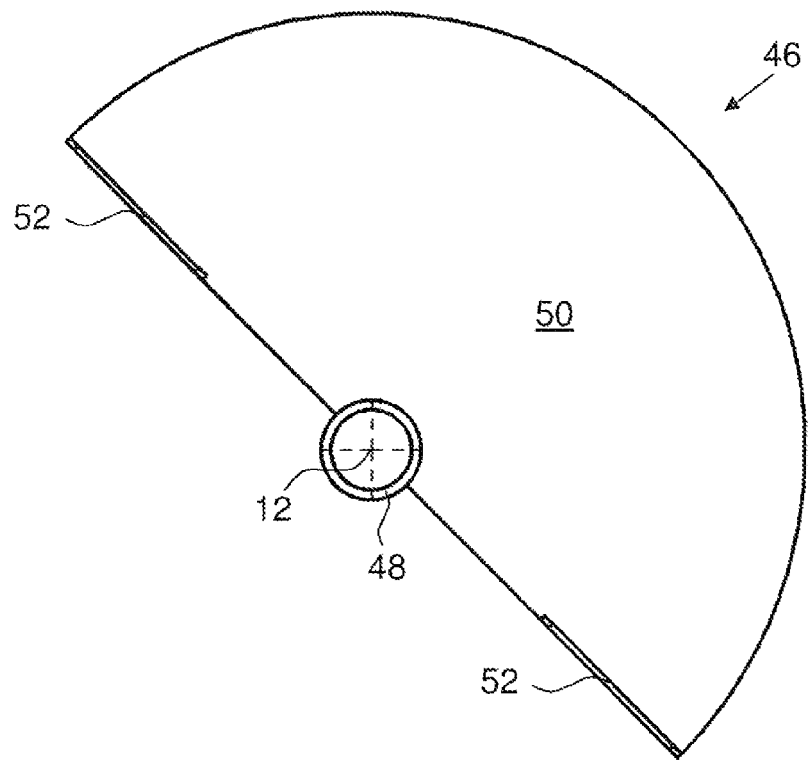
Figure 9:
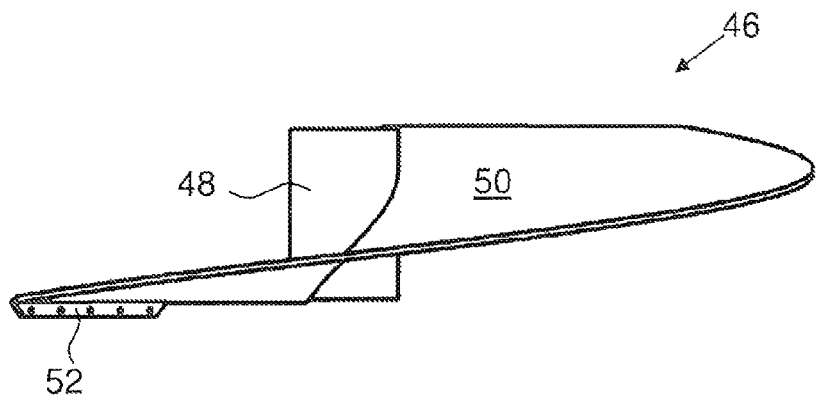
Figure 10:
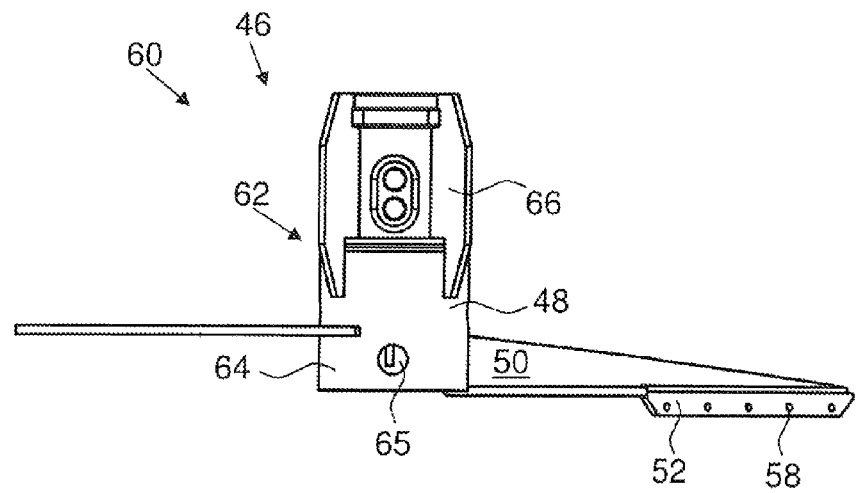
Figure 11:
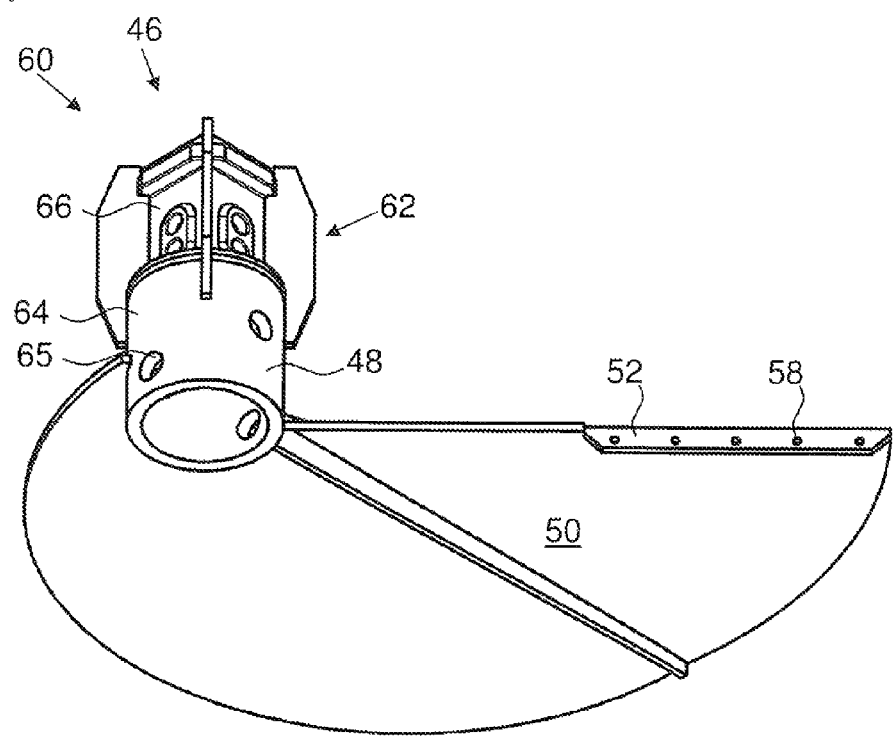

In the following the invention will be described further by way of the accompanying drawings, wherein show:

FIG. 1 a side view of an auger in a dismantled state;
FIG. 2 a side view of an auger in the assembled operating state;
FIG. 3 a perspective view of a dismantled auger as seen at an angle from below;
FIG. 4 a perspective view of a dismantled auger as seen at an angle from above;
FIG. 5 a perspective view of a base unit of an auger comprising the cutting means and the central receiving shaft;
FIG. 6 a view from below of the base unit of FIG. 5;
FIG. 7 a side view of the base unit of FIG. 5;
FIG. 8 a view from above of a conveyor flight piece of an auger;
FIG. 9 a side view of the conveyor flight piece of FIG. 8;
FIG. 10 a side view of a terminal unit comprising an upper conveyor flight piece and a junction head; and
FIG. 11 a perspective view of the terminal unit of FIG. 8.

In the following an embodiment of an auger 10 according to the invention will be described with reference to FIGS. 1 to 11. Equivalent components are designated throughout the Figures with the same reference signs.

The auger 10 comprises a longitudinal axis 12 which constitutes an axis of rotation of the auger. The auger 10 has a first axial end 14 which, for the purpose of driving the auger 10 in a rotating manner, can be connected to a drive element, such as a drive shaft of a rotary motor or a drill rod, such as a Kelly bar. Furthermore, the auger 10 has a second axial end 16, which lies opposite the first axial end and forms a tip of the auger 10. The first axial end 14 can also be referred to as the upper end and the second axial end 16 can be referred to as the lower end of the auger 10.

The auger 10 comprises a base element 20 with a tubular, round central receiving shaft 22 extending in the axial direction along the longitudinal axis 12 and a starter piece 26 with a cutting means 30. The starter piece 26 is located at the borehole-facing end of the central receiving shaft 22, i.e. at the lower end of the auger 10. The central receiving shaft 22 is designed as a hollow shaft and can also be referred to as a force-transmitting hollow stem.

The starter piece 26 with the cutting means 30 is firmly attached, in particular in a rotationally and axially fixed manner, to the central receiving shaft 22. For example the starter piece 26 can be welded to the central receiving shaft 22 or otherwise connected thereto in a non-detachable manner. Alternatively, it is also possible for the starter piece 26 to be detachably fastened on the central receiving shaft 22.

In addition to the base element 20 the auger 10 comprises several, i.e. at least two, conveyor flight pieces 46 which can be slid from above along the longitudinal axis 12 onto the central receiving shaft 22 or placed over the receiving shaft 22. Each conveyor flight piece 46 comprises a central mounting pipe 48 and one or several flight plates 50 arranged at an outer jacket of the mounting pipes 48. The mounting pipes 48 have a pipe- or sleeve-shaped design and rest over their surface against an outer jacket of the receiving shaft 22.

In the assembled state of the auger 10, which is shown in FIG. 2, the individual flight plates 50 form a continuous conveyor helix 44. Accordingly, the mounting pipes 48 form an encasing pipe 42 composed of segments and the conveyor flight pieces 46 jointly form a spiral-shaped conveyor flight 40. The individual conveyor flight pieces 46 can cover different pitches as length.

The conveyor flight 40 extends along the entire length of the auger 10 or rather along the entire length of the central receiving shaft 22 or at least along a predominant part thereof. In principle, the receiving shaft 22 can also be extensible.

The individual flight plates 50 have the shape of a helical section extending along 180°, i.e. half a turn or revolution, around the mounting pipe 48. Alternatively, for example flight plates with 360°, 540° or 720° are possible, too.

On the radial edges 51 of the flight plates 50 connecting means 52 for connecting the flight plate 50 to an adjacent flight plate 50 are provided. The connecting means 52 comprise a connecting plate 56, which extends along the edge 51 and can also be referred to as flange. The connecting plates 56 as well as areas of the edges 51, which remain free where necessary, form a stop for an adjacent flight plate 50. Here, the junction surfaces of the connecting plates 56 are aligned perpendicularly to the circumferential direction of the auger 10. In the connecting plates 56 passages 58 can be provided for example for a screw connection with an adjacent connecting plate.

The cutting means 30 is firmly connected to the central receiving shaft 22. To fasten the cutting means 30 or the starter piece 26 a ring-shaped fastening area 36 is provided on the starter piece 26, in which the central receiving shaft 22 is received. The cutting means 30 comprises two cutting edges 32 offset by 180° which, starting from an inner area of the auger 10, extend radially outwards. The length or radial extension of a cutting edge 32 corresponds approximately to the radius of the flight plates 50. On the cutting edges 32 cutting and/or drilling tools 34 are arranged.

In a central lowermost area of the auger 10 a drill bit 70 is located that precedes the radial cutting edges 32 in the axial direction. The drill bit 70 is received in a detachable or exchangeable manner in a receiving member 72 and substantially serves for centering the auger 10. At its lower end the central receiving shaft 22 is closed by a conical section 74, on which the receiving member 72 is designed.

On the starter piece 26 which is firmly connected to the central receiving shaft 22 a first flight plate 50 is arranged that is connected in a rotationally fixed manner to the central receiving shaft 22. By preference, the first or lowermost flight plate 50 is firmly connected to the cutting means 30, e.g. by being screwed on or welded thereto. To support the lower flight plate 50 one or more supports 38 can be provided which support the flight plate 50 on the cutting means 30. Furthermore, the starter piece 26 comprises a collar ring 33 arranged in the area of the outer circumference of the auger 10. On the collar ring 33 further cutting tools 34, in particular cutting teeth, are attached.

Due to the fact that only comparatively small forces are exerted on the conveyor flight pieces 46, which essentially only serve to convey ground material already loosened, it can be sufficient to establish the rotationally fixed connection of the conveyor flight pieces 46 with the starter piece 26 solely via the flight plates 50, in particular via the connecting means 52. Basically, it is therefore possible that at least one of the mounting pipes 48 of the conveyor flight pieces 46 is rotatable in relation to the central receiving shaft 22, as depicted in the Figures. Alternatively or additionally to this, the individual mounting pipes 48 can also be connected in a rotationally fixed manner to the central receiving shaft 22. To this end appropriate engaging elements can be provided on the central receiving shaft 22 and/or on the mounting pipes 48 or receiving shaft 22 and mounting pipes 48 can be designed as a polygonal part for example.

At an end of the auger 10 lying opposite the cutting means 30 a terminal conveyor flight piece 60, which can also be referred to as terminal unit, is provided as the uppermost conveyor flight piece 46. Just as the further conveyor flight pieces 46, the terminal conveyor flight piece 60 has a flight plate 50. Moreover, the terminal conveyor flight piece 60 has a connecting area 64, by means of which it is connected in a rotationally fixed manner to the central receiving shaft 22. To this end the central receiving shaft 22 has a junction area 24, which can be brought into form-locking engagement with the connecting area 64. In the illustrated embodiment, junction area 24 and connecting area 64 have openings 25 and 65 respectively for locking bolts. Alternatively, junction area 24 and connecting area 64 can also be designed e.g. as a polygonal part, such as a square. The connecting area 64 can, in particular, be designed on a mounting pipe 48 of the terminal conveyor flight piece 60.

For connection with a drive element, such as a drill rod or the output shaft of a rotary motor, a coupling area 66, which can also be referred to as junction head, is provided on the terminal conveyor flight piece 60. Via the coupling area 66 a torque can be introduced into the terminal conveyor flight piece 60. The torque can be introduced via the connecting area 64 directly into an upper section of the central receiving shaft 22. In particular, the coupling area 66 can be a so-called Kelly box for introducing a connector of a Kelly bar.

Connecting area 64 and coupling area 66 form a head element 62 of the terminal conveyor flight piece 60. The head element 62 is mounted onto the receiving shaft 22, in particular the junction area 24, and projects beyond the receiving shaft 22 in the axial direction.

Due to the fact that the terminal conveyor flight piece 60 is connected in a rotationally fixed manner to the central receiving shaft 22 an introduced torque can be passed directly from the terminal conveyor flight piece 60 via the central receiving shaft 22 into the cutting means 30. Therefore, the conveyor flight pieces 46 arranged between terminal conveyor flight piece 60 and cutting means 30 do not have to be designed for the transmission of the torque required for removing ground material and can be designed correspondingly lighter.

All in all, with the auger according to the invention an especially stable drilling element is provided, which offers the possibility of dismantling advantageous to transportation.

The invention claimed is:

1. Auger having
   cutting means for removing ground material
   a conveyor flight for conveying the ground material removed by the cutting means, and
   a head element
   whereby the conveyor flight has several conveyor flight pieces which are mounted to be rotated by the head element and are arranged along an axial direction of the auger and connected to each other in a detachable manner,
   wherein
   a central receiving shaft having a cylindrical shape in cross sectional view is provided, at one end of which the cutting means is arranged in a fixed manner, and the central receiving shaft has a junction area at its other end thereof;
   the conveyor flight pieces of the conveyor flight have a mounting pipe each, said mounting pipe having a cylindrical shape in cross sectional view is fittingly mounted onto the central receiving shaft without fixation between an outer circumference of the central receiving shaft and an inner circumference of the mounting pipe, whereby the central receiving shaft projects through each of the mounting pipes,
   the conveyor flight pieces of the conveyor flight have flight plates, which are arranged at an outer circumference of the mounting pipes;
   the flight plates form a continuous conveyor helix, which extends from the cutting means at a lower axial end to an upper axial end of the auger;
   on the flight plates, connecting means for detachably connecting the conveyor flight pieces to adjacent conveyor flight pieces are arranged;
   the connecting means includes connecting plates; each of the connecting plates is provided along radial edge of the flight plate, and each of the connecting plates extends downwards from the bottom surface of the flight plate and perpendicularly to the circumferential direction of the auger,
   the connecting plates of the adjacent conveyor flight pieces are coupled together, and
   the head element has a connecting area that is connected with the cutting means via the receiving shaft in such a manner that the connecting area is engaged with the junction area of the central receiving shaft.

2. Auger according to claim 1,
   wherein
   the receiving shaft can be driven in a rotating manner via the junction area.

3. Auger according to claim 1,
   wherein
   the length of the receiving shaft corresponds approximately to the length of the entire auger.

4. Auger according to claim 1,
   wherein
   the flight plates each have a maximum of two turns.

5. Auger according to claim 1,
   wherein the cutting means has at least one cutting edge in an area of a conveyor flight run-in.

6. Auger according to claim 1,
wherein
at an end of the auger lying opposite the cutting means a coupling area is provided, which can be coupled to a drive element for driving the auger in a rotating manner.

7. Auger according to claim 1,
wherein
the receiving shaft is designed as a hollow shaft.

8. Auger according to claim 1,
wherein
at a lower end of the receiving shaft a drill bit is arranged, which precedes the cutting means during drilling operation and is connected in a rotationally fixed manner to the receiving shaft and the cutting means.

9. Method for producing a borehole in the ground by means of an auger according to claim 1,
whereby ground material is removed by means of the cutting means and conveyed by means of the conveyor flight.

10. Auger according to claim 1, wherein
the connecting plates have passages for a screw connection with adjacent connecting plates.

11. Auger according to claim 1, wherein
the several conveyor flight pieces are sandwiched between the head element and the cutting means.

\* \* \* \* \*